United States Patent [19]
Hellman et al.

[11] Patent Number: 6,145,529
[45] Date of Patent: Nov. 14, 2000

[54] MONITORING STEAM TRAPS USING RF SIGNALING

[75] Inventors: Michael Paul Hellman, Portage; James F. Washburn, Kalamazoo; Anthony Sajkowski, Shelby Township, all of Mich.; Donald J. Hume, Boulder; Andrew F. Drenick, Longmont, both of Colo.

[73] Assignee: Armstrong International, Inc., Stuart, Fla.

[21] Appl. No.: 09/388,223

[22] Filed: Sep. 1, 1999

Related U.S. Application Data

[63] Continuation of application No. 08/893,914, Jul. 11, 1997.
[51] Int. Cl.[7] .................................................. F16K 31/00
[52] U.S. Cl. .............................. 137/1; 137/554; 137/558
[58] Field of Search ........................ 251/129.04; 137/554, 137/624.11, 624.12, 558, 1

[56] References Cited

U.S. PATENT DOCUMENTS

| | | | |
|---|---|---|---|
| 4,630,633 | 12/1986 | Vallery | 137/185 |
| 4,665,385 | 5/1987 | Henderson | 340/539 |

*Primary Examiner*—A. Michael Chambers
*Attorney, Agent, or Firm*—MacMillan, Sobanski & Todd, LLC

[57] ABSTRACT

A method of monitoring the status of a plurality of steam traps includes sensing with a monitor at least one process condition in each of a plurality of steam traps, transmitting radio frequency signals responsive to the sensed process condition of each steam trap with transmitters associated with the steam traps, and receiving the signals generated by the transmitters with a receiver. In one embodiment of the invention, the signals from at least some steam traps are received and retransmitted by a repeater positioned between the steam traps and the receiver.

15 Claims, 4 Drawing Sheets

MONITORING STEAM TRAPS USING RF SIGNALING

CROSS-NOTING TO RELATED APPLICATIONS

This is a continuation of application Ser. No. 08/893,914, filed Jul. 11, 1997.

TECHNICAL FIELD

This invention relates in general to steam traps of the type that remove condensate from process steam lines. More particularly, this invention relates to systems for monitoring the performance and status of a large number of steam traps.

BACKGROUND OF THE INVENTION

Steam traps are a common item of equipment in factories, refineries and other industrial or commercial facilities. The steam traps are installed in process steam lines and act to separate condensed steam, or "condensate", from the steam without allowing the steam to escape. The separated condensate is then recycled back through condensate return lines to the boiler for conversion back to steam. To be effectively operating, the steam trap must prevent steam from escaping past the steam trap and entering the condensate return lines. If steam is allowed to pass through the steam trap into the condensate return line, the result is a loss of valuable energy and a reduction in the efficiency of the steam system.

There are several well known types of steam traps, including inverted bucket traps, float traps, thermostatic traps and disc traps. Manufacturing facilities, refineries and large buildings often are fitted with extensive systems of steam lines for heating and for process steam. Some of these facilities can contain upwards of 1,000 or more steam traps. To promote efficient operation of the steam traps, some type of monitoring or inspection is required to detect malfunctioning traps so that they can be corrected.

In the past, several different methods of checking on the condition of steam traps have been used. One system uses a battery powered probe to sense the temperature of the traps. Another system uses a battery powered probe in inverted bucket steam traps to sense the presence of water in the trap. When an inverted bucket steam trap has water in it, the trap has a state or condition referred to as "prime". A properly operating inverted bucket trap must have a condition of prime if it is functioning properly. A requisite amount of water in the trap is indicative of proper steam trap operation. A known steam trap monitoring system is disclosed in U.S. Pat. No. 4,630,633 to Vallery, which is hereby incorporated by reference. This patent discloses a probe extending into a steam trap, the probe being responsive to the level of condensate in the steam trap.

Existing steam trap monitoring schemes include systems of signal lights on the steam traps indicative of the process conditions in the traps. Such systems require visual inspection of all the steam traps in the entire manufacturing facility for proper monitoring of the steam traps. In the past, this type of manual inspection has proven to be difficult to sustain. Without a rigorously enforced inspection system, malfunctioning traps will go undetected.

Another scheme to monitor the steam traps of a facility is to provide a hard wire system, with physical wiring threaded from each of the steam traps to one or more centrally located steam trap control stations for receiving and storing data concerning the process conditions of the steam traps. It can be appreciated that in large facilities the work required to hard wire thousands of steam traps is very expensive, and in fact cost prohibitive. Hard wire systems are especially difficult to install in retrofit situations where the steam trap monitoring system is added after the facility is already built. Also, a hardwired system does not easily allow changes in the physical location of the steam traps.

It would be advantageous if a steam trap monitoring system could be devised to economically convey process condition information from a multitude of steam traps to one or more control stations. Such a system should be operable with low maintenance, and should be easy and economical to install. Further, the system not only should provide process conditions of the steam trap, but preferably should also be able to positively identify the steam trap from which the signal originates.

SUMMARY OF THE INVENTION

The above objects as well as other objects not specifically enumerated are achieved by a method of monitoring steam traps using RF signaling to communicate the process conditions of the steam traps to a centralized receiving station. According to this invention, there is provided a method of monitoring the status of a plurality of steam traps including sensing with a monitor at least one process condition in each of a plurality of steam traps, transmitting radio frequency signals responsive to the sensed process condition of each steam trap with transmitters associated with the steam traps, and receiving the signals generated by the transmitters with a receiver. In one embodiment of the invention, the signals from at least some of steam traps are received and retransmitted by a repeater positioned between the steam traps and the receiver.

In a specific embodiment of the invention a plurality of steam traps are monitored by sensing with a monitor process conditions including the temperature and the presence of condensate within each of a plurality of steam traps, transmitting radio frequency signals responsive to the sensed process conditions of each steam trap with transmitters associated with the steam traps, and receiving the signals generated by the transmitters with a receiver, wherein the signals from at least some of steam traps are received and retransmitted by a repeater positioned between the steam traps and the receiver.

DETAILED DESCRIPTION OF THE INVENTION

Figure 1:
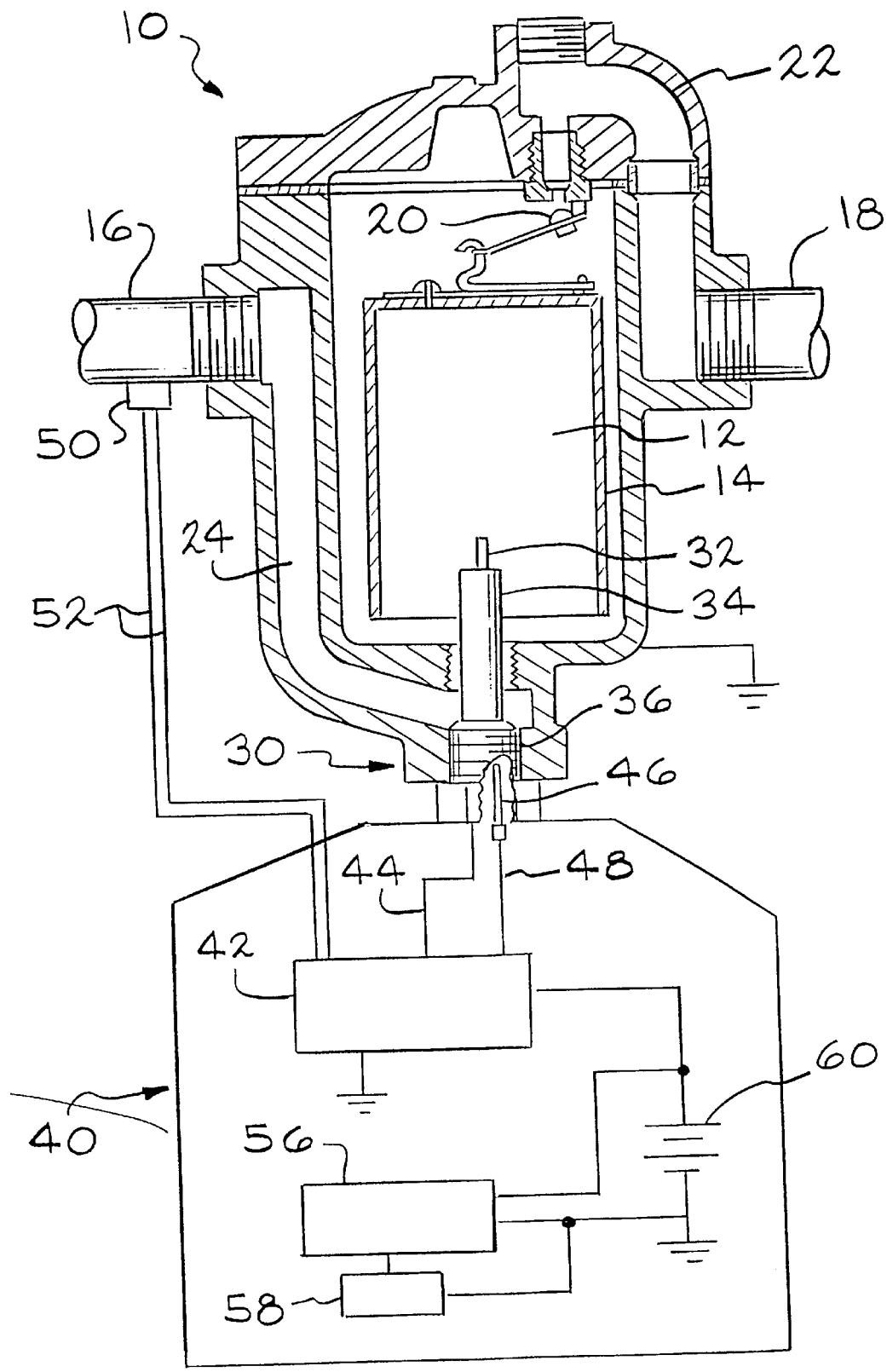
FIG. 1 is a schematic view, partially cut away, in elevation of a steam trap and a monitor of the invention.

As shown in FIG. 1, the steam trap is generally indicated at 10. The steam trap 10 is of the inverted bucket type, and includes a bucket chamber 12 and an inverted bucket 14 which can rise or fall within the bucket chamber 12. Although an inverted bucket steam trap is used to illustrate the invention, it is to be understood that the invention can be used with other types of steam trap. The steam trap 10 is connected to a live steam line 16 which supplies steam into the trap. The trap 10 is also connected to a condensate return line 18 to direct the condensate back to the stream generator, such as a boiler, not shown. A valve 20 within the steam trap controls the flow of condensate through the condensate outlet passageway 22 to the condensate return line 18. As steam and condensate enter the steam trap 10 via the steam inlet passageway 24, the steam and condensate flow upwardly past the conductivity probe 30 and into the bucket chamber 12. When a significant amount of condensate collects in the bucket chamber 12, the inverted bucket 14 will drop from its normally elevated position, thereby opening the valve 20 to allow the condensate in the bucket chamber 12 to exit the trap via the condensate passageway outlet 22 and condensate return line 18.

The conductivity probe 30 includes an electrode 32 which is covered with an electrically insulating material 34 so that the electrode is electrically isolated. The probe is mounted in a probe bushing 36. When a charge is placed on the electrode, and when there is condensate present in the trap, a circuit can be completed from the electrode 32 to any metallic part of the steam trap 10. The condensate is electrically conductive, thereby providing a path to complete the circuit. In this manner, the prime condition (presence or absence of condensate) in the steam trap can be detected. The above-described steam trap is generally conventional and well known in the art.

Positioned beneath the steam trap 10 is the monitor 40 which houses the apparatus for monitoring the status of the trap. The monitor 40 can be any suitable enclosure for encasing the sensing equipment required for operation of the system. Positioned within the monitor is a microprocessor-based sensor controller 42, which can be any suitable programmable device capable of controlling the gathering, storage and dissemination of process condition data. A suitable sensor controller is a PIC 16C22 chip from Microchip.

Various input devices are connected to the sensor controller 42 to supply the sensor controller with data. For example, the electrode 32 is connected via lead line 44 to the sensor controller to provide input regarding the prime status (prime or no prime) of the steam trap. Likewise, a thermister 46 is positioned within the probe bushing 36, and is connected to the sensor controller 42 via lead line 48. Thermisters are well known, and the thermister 46 can be any type suitable for measuring the temperature of the probe bushing 36, and hence the steam trap 10. A suitable thermister 48 is a 1H-104T thermister manufactured by Thermodisc. The sensor controller 42 can be programmed to set a desired level for acceptable temperature and conductivity sensitivity.

Another input device for monitoring process conditions is a pressure switch 50 which is connected to the sensor controller 42 by lead lines 52. Any suitable connection can be used. The pressure switch senses the pressure within the steam line 16, and this information is supplied to the sensor controller 42. Pressure switches are well known to those skilled in the art of steam process instrumentation. The sensor controller can be programmed to sense not only the pressure of the steam line 16, but also whether a pressure switch 50 is even installed in the system, since there may be some installations where there is no pressure switch and the pressure is not monitored. In addition to the process condition sensing devices described above (pressure, temperature and prime), other sensors, not shown, could be employed to sense other process conditions.

Also positioned within the monitor 40 is a transmitter microprocessor 56 and a microprocessor-based radio frequency transmitter 58. The transmitter microprocessor 56 receives input from the sensor controller 42, and the transmitter 58 transmits an appropriate radio frequency signal responsive to the sensed process conditions. The transmitter microprocessor 56 can be any suitable device that is programmable and is capable of receiving the output from the sensor controller 42. A suitable transmitter microprocessor is a model 68HC05 microprocessor by Motorola. The transmitter 58 can be any suitable device for transmitting an appropriate radio frequency signal responsive to the condition of the steam trap 10. A preferred transmitter is a model FA 210 universal transmitter by Inovonics Corporation, Boulder, Colo.

Although the illustrated embodiment shows the sensor controller 42 and the transmitter microprocessor 56 as two separate microprocessors, it is to be understood that a single programmable microprocessor, not shown, can be used to control both the sensing and transmitting functions.

A battery 60 is provided within the monitor 40 to provide power to the components within the monitor. Any suitably sized battery, such as a 3-volt battery, can be used. As will be explained in greater detail below, the programmable sensor controller 42 and the programmable transmitter 56 are programmed to operate periodically but for only short periods of time, so that current is drawn from the battery 60 for only periods of short duration. This method greatly prolongs the life of the battery, thereby lengthening the time before servicing the steam trap monitoring system is required. Preferably, the monitoring system of the invention is a send only system, capable of sending signals but not receiving signals. To receive signals, the monitor would have to be fitted with a receiver that would have to be activated or powered either continuously, or at least periodically, thereby causing an additional drain on the battery 60, and shortening the service life of the battery. By designing the steam traps to have no means for receiving signals from a separate signaling device, such as a remote transmitter, the efficiency of the system is enhanced. It is to be understood, however, that the monitors could also be provided with receivers, not shown.

Figure 2:
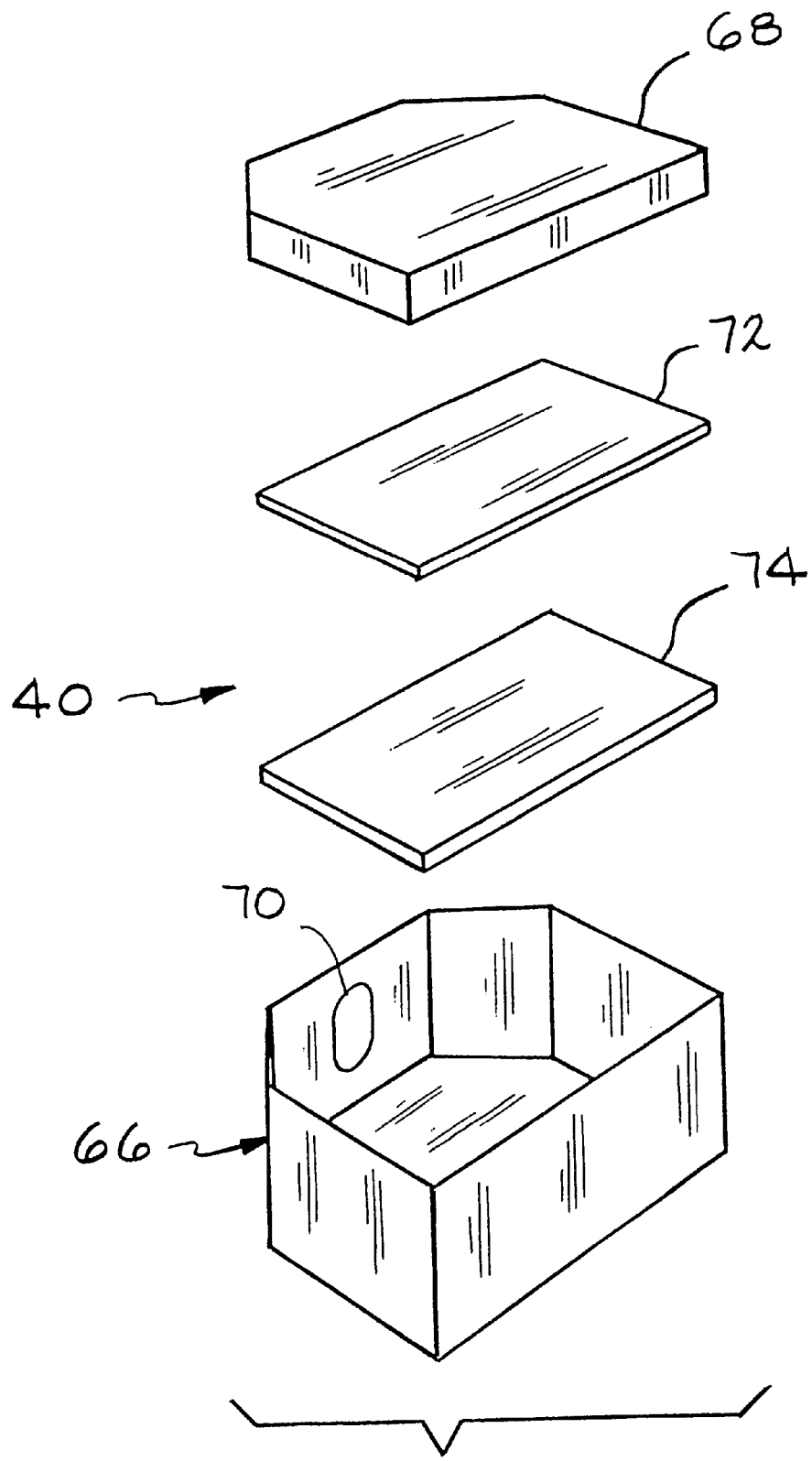
FIG. 2 is an exploded schematic view in perspective of the monitor of FIG. 1.

As shown in FIG. 2 the monitor 40 can be comprised of a monitor case 66 and monitor cover 68. The monitor case 66 is provided with an orifice 70 through which the bushing 36, electrode 32 and thermister 46 are extended. Positioned within the monitor case are the sensor controller board 72 and the transmitter board 74. The sensor controller board 72 includes the sensor controller 42 and the battery 60 (both not shown in FIG. 2). The transmitter board 74 includes the transmitter microprocessor 56 and the transmitter 58 (both not shown in FIG. 2).

Figure 3:
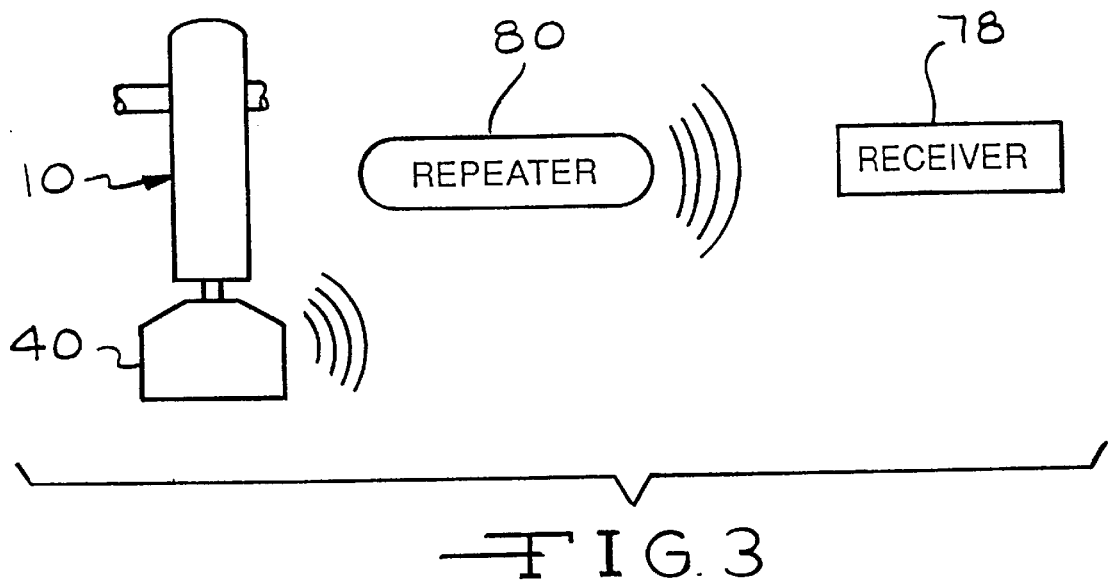
FIG. 3 is a schematic view in elevation of the steam trap monitoring system of the invention.

FIG. 3 shows a monitoring system of the invention where the monitor 40 of the steam trap 10 transmits an RF signal directed toward a receiver 78. The receiver can be any suitable device for picking up the RF signal. It is to be understood that the characteristics of the receiver 78 must be matched to those of the transmitter 46 to provide a proper communications link and optimal RF performance. A preferred receiver is an Inovonics FA403 receiver. Associated with the receiver 78 is a data handling device, such as a computer, not shown, for storing and displaying data from the steam trap 10. Preferably, the computer is adapted to provide alarms or other indications when steam traps are determined to be malfunctioning.

In some installations of the monitoring system of the invention there will be sufficient distance between the steam trap 10 and the receiver 78 that the RF signal will be too weak or attenuated at the receiver for reliable data transmission. Therefore, the system includes a repeater 80 positioned between the steam trap 10 and the receiver 78, as illustrated in FIG. 3. The repeater receives the RF signal from the transmitter, amplifies the signal and rebroadcasts the signal. Suitable repeaters are commercially available from Inovonics. The repeater 80 should also be matched to the characteristics of the transmitter 58 and receiver 78 to provide a working communications link. A preferred repeater is a model 525 repeater by Inovonics. The repeater 80 receives the signal from the steam trap monitor 40 and re-broadcasts the signal with enough strength to reach the receiver 78. It is to be understood that several repeaters 78 can be used in series to extend the length between remote steam traps 10 and the receiver 78.

Figure 4:
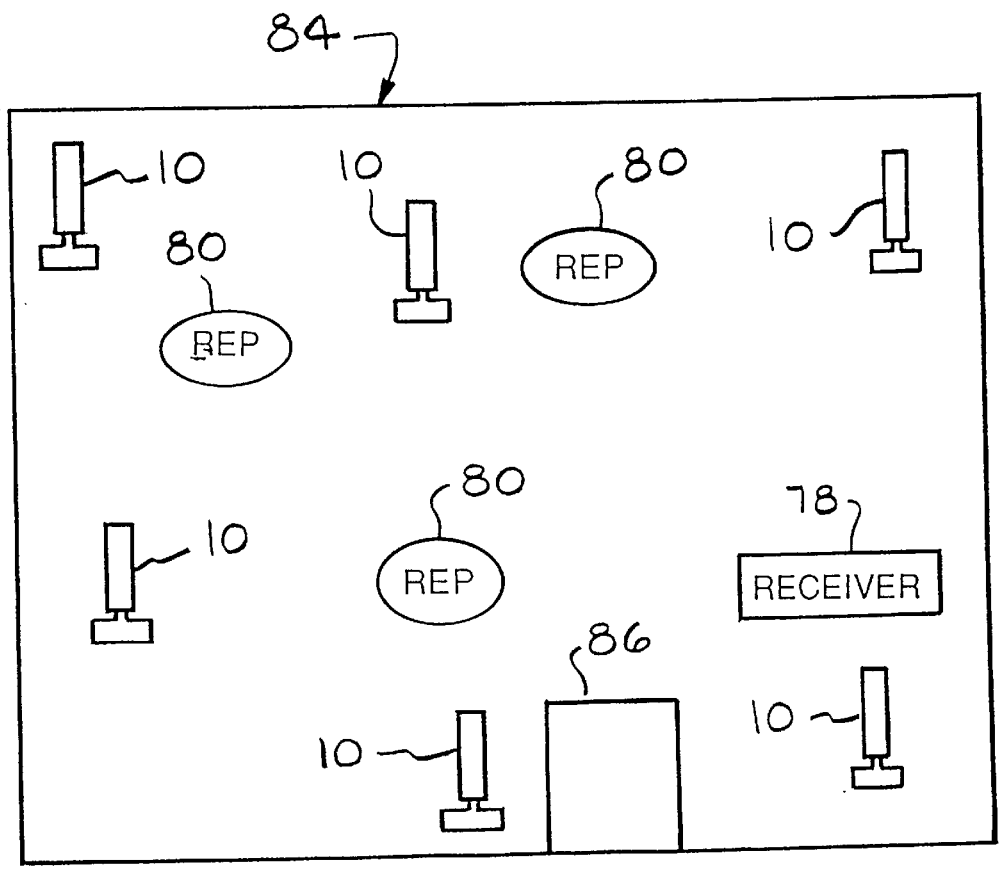
FIG. 4 is schematic plan view of an industrial facility equipped with a steam trap monitoring system of the invention.

As shown in FIG. 4, an industrial facility 84 includes a series of steam traps 10, each having a monitor 40. Several repeaters 80 are positioned throughout the industrial facility 84 to receive and rebroadcast the RF signals so that the receiver 78 will eventually take in or receive all the signals. It can be seen that the signals from some of the steam traps 10 are received and retransmitted by the repeaters positioned between some of the steam traps and the receiver 78.

In some industrial facilities there may be objects, such as obstruction 86, which block the transmission of RF signals. These obstructions could be metallic objects, such as piping, sheet metal installations, or industrial equipment. Other obstructions include grids or similar arrangements or networks of metallic materials, such as a wire fence used to screen off a tool crib in the plant facility. A layer of chicken wire or metal lathe embedded within a wall will prevent RF signals from passing through the wall. The use of a repeater 80 enables the signal to go around the obstruction 86 and still reach the receiver 78.

Figure 5:
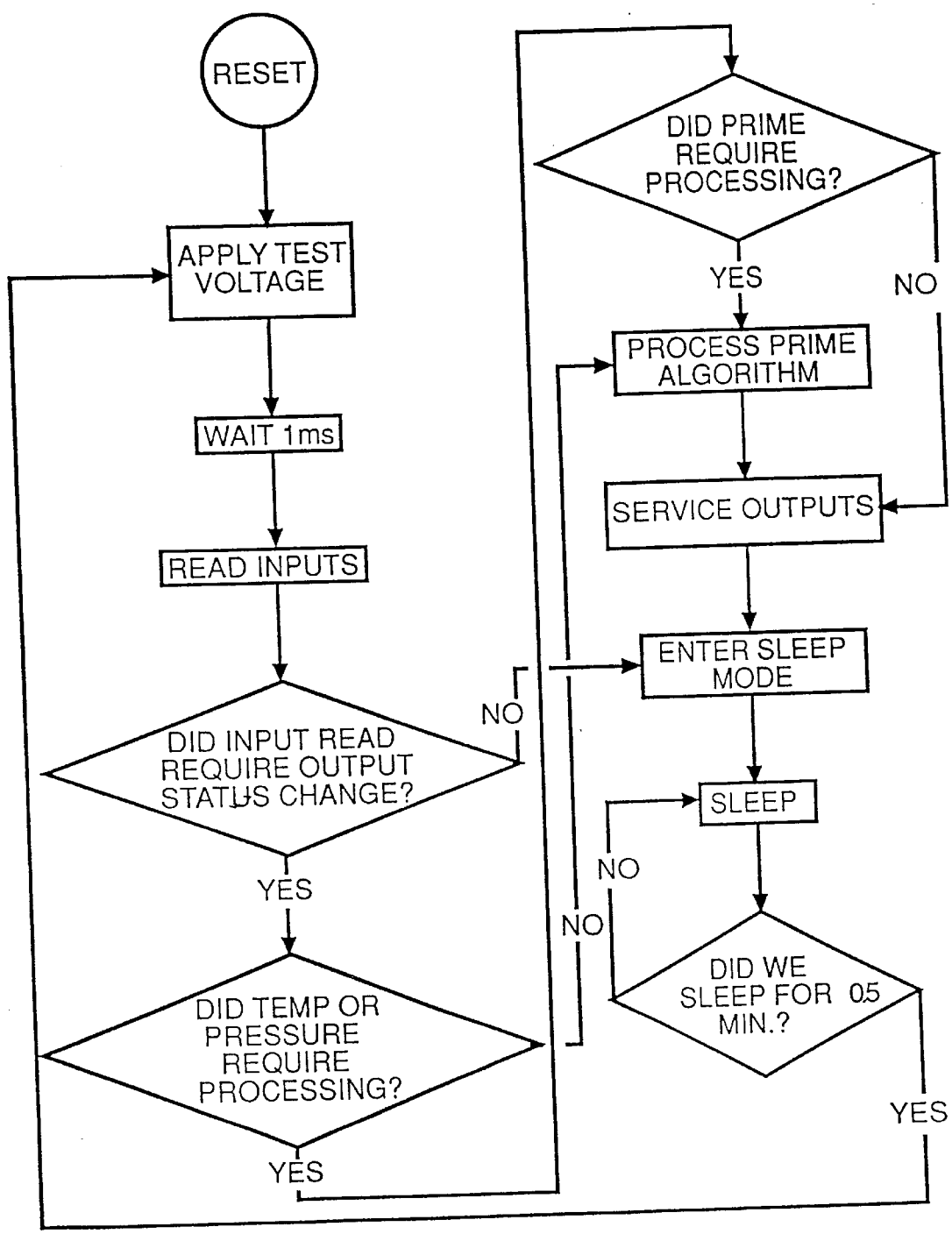
FIG. 5 is a flow diagram of the operating algorithm of the sensor controller used in the invention.

One of the important aspects of the method of the invention is the ability of the monitoring system to extend the life of the battery 60 by selectively activating various components of the system. The programmable sensor controller can be programmed with an algorithm which tests or senses various process conditions all within a short time frame of, for example, 2 milliseconds (ms) of active time. In a specific embodiment of the invention, the sensor controllers actively determine the process conditions and establish the status of the steam traps within a period of active time, and remain inactive for a period of inactive time which is at least 100 times as long as the period of active time. The result of the process condition monitoring is a status of the steam trap, typically in one of three modes: steam trap OK, steam trap cold, or steam trap blow through (steam trap malfunctioning by allowing steam to continuously blow through.) The status of the steam trap is then transmitted to the transmitter microprocessor 56. Following the period of active operation, the controller and sensors will be inactive for a relatively long period of time, such as a half second. The inactive time can be referred to as "sleep" time. The operating algorithm is shown in FIG. 5. The algorithm can provide that once a status of acceptable steam trap operation has been achieved, the controller, upon waking up from a "sleep", need only determine that the process conditions are still acceptable, and then go back to a sleep mode. It can be appreciated that the process of holding the sensor controller and associated equipment in a sleep mode for a vast majority of the time greatly extends the life of the battery. Preferably the period between successive steps of sensing process conditions is within the range of from about 0.2 to about 5 seconds. It is to be understood that different algorithms could be used to operate the system of the invention.

A useful modification of the operating algorithm is a process prime subalgorithm, not illustrated, which evens out a false sensed condition of loss of prime during the startup of the flow of steam through the steam line 16 after a period of inactivity. Also, a false sensing of loss of prime can occur as steam surrounds the end 20 of the conductivity electrode 32 in a normally functioning steam trap. Further, a false sensing of loss of prime condition can occur in a failed trap that is discharging a high condensate load. Also, the prime can boil off in a good trap as the pressure in the system is vented. For all these reasons, the process prime subalgorithm provides that a condition of loss of prime must be confirmed by a second or third look or reading, after a time delay of several minutes.

The transmitter 58 and programmable transmitter microprocessor 56 operate somewhat independently of the sensor controller 42. The transmitter microprocessor 56 is programmed to look at or sense the status (OK, cold or blow through) of the steam trap as reported by the sensor controller 42. This sensing or sampling by the transmitter microprocessor 56 occurs periodically, such as perhaps once every half second. The transmitter 58 periodically transmits an RF signal indicative of the status of the steam trap. The transmitting of the RF signal can be accomplished with a period different from the period of the sampling by the transmitter microprocessor 56. Preferably, the period between successive steps of transmitting signals to the receiver is within the range of from about 0.5 to about 300 seconds. However, upon detection of a condition outside the programmed limits, the signal from the transmitter 58 is transmitted to the receiver 78 immediately.

The RF signal is preferably a radio wave signal having a frequency within the range of from about 902 to about 928 megahertz (MHz). One of the potential problems of steam trap monitoring using RF transmission is the possibility that interference or noise may occur at various frequencies and at various times. To overcome this problem, the transmitter microprocessor 56 and transmitter 58 are programmed to vary the frequency of the RF signal, so that some signals are transmitted at a first frequency and other signals are transmitted subsequently at a different frequency. This is known as a frequency hopping spread spectrum, which uses a multitude of different frequencies to provide an FCC-certified spread spectrum wireless communications link. Therefore, the transmitters send information redundantly on a multitude of frequencies (up to 50) to insure reliability. Thus it can be seen that a first signal sent from a steam trap at a first time will have a frequency differing from the frequency of a second signal sent from the same steam trap at a second time. For example, at a first time the RF signal transmitted may have a frequency of 915 MHz, and at a second, subsequent time the RF signal may have a frequency of 920 MHz. In summary, it is advantageous to use different frequencies to provide diversity.

Another advantageous optional feature of the invention provides that the period between successive steps is programmed to vary slightly over time so that overlapping or conflicting RF signals being emitted simultaneously from neighboring steam traps will be resolved. Further, it is preferred that each transmitter be programmed to emit an RF signal having a unique identifier code so that the receiver can positively identify the steam trap from which the signal originates.

An advantageous aspect of one particular embodiment of the invention is that the monitor and associated equipment are "intrinsically safe", which means that under various conditions the monitor will not produce a spark, or a heated surface sufficient to ignite or cause explosion of various potentially hazardous materials. The monitor has a built-in intrinsic safety design that prevents sparks and excessively hot surfaces which, if present, could cause a hazard in certain environments, such as environments containing explosive gases like acetylene, hydrogen or gasoline. An intrinsically safe circuit is a circuit that is energy limiting so that it can be operated in hazardous locations without the risk of ignition due to sparks or excessively hot surfaces. The circuit can be made intrinsically safe by using low current and low voltage devices, and by limiting the capacitance and inductance components to low levels. The spark potential and hot surface generation are designed to be below the ignition curve for the particular environmental application. The concept of intrinsically safe systems is known to those skilled in the art of electronic circuit design, and intrinsically safe systems in general are available from R. Stahl, Inc., Woburn, Mass.

The principle and mode of operation of this invention have been described in its preferred embodiment. However, it should be noted that this invention may be practiced otherwise than as specifically illustrated and described without departing from the scope of the invention.

What is claimed is:

1. A method of monitoring the status of at least one steam trap, comprising the steps of:

sensing a process condition in at least one steam trap;

transmitting a radio frequency signal at a first frequency responsive to the process condition associated with the at least one steam trap;

transmitting a radio frequency signal at a second frequency responsive to the process condition associated with the at least one steam trap, said second frequency being at a different frequency than said first frequency; and receiving the first and second radio frequency signals.

2. The method of claim 1 in which the sensing of the process condition is sensing one of a temperature of the at least one steam trap and a presence of condensate within the at least one steam trap.

3. The method of claim 1 in which the sensing of the process condition involves sensing a pressure of a steam line feeding the at least one steam trap.

4. The method of claim 1 in which the first and second radio frequency signals transmitted from the at least one steam trap are transmitted periodically.

5. The method of claim 4 where the process condition is sensed periodically, and more frequently than the transmission of the first and second radio frequency signals from the at least one steam trap.

6. The method of claim 5 where the period between successive steps of sensing the process condition is within the range of from about 0.2 to about 5 seconds, and the period between successive steps of transmitting the first and second radio frequency signals is within the range of from about 0.5 to about 300 seconds.

7. The method of claim 1 where a signal indicative of the process condition is transmitted periodically when the sensed process condition is within a programmed limit, but where one of the first and second signals is transmitted immediately upon detection of a process condition outside the programmed limit.

8. A method of monitoring the status of a plurality of steam traps, comprising the steps of:

(a) sensing a process condition in a plurality of steam traps during a first time interval;

(b) transmitting a radio frequency signal responsive to the process condition associated with each steam trap during the first time interval;

(c) receiving the radio frequency signal from each steam trap during the first time interval; and (d) performing steps (a) through (c), but at a different time interval than the first time interval.

9. The method of claim 8 in which the sensing of the process condition is sensing one of a temperature of the at least one steam trap and a presence of condensate within the at least one steam trap.

10. The method of claim 8 in which the sensing of the process condition involves sensing a pressure of a steam line feeding the at least one steam trap.

11. A method of monitoring the status of at least one steam trap, comprising the steps of:

sensing a process condition in at least one steam trap;

transmitting a radio frequency signal responsive to the process condition associated with the at least one steam trap; and receiving the radio frequency signal, where the radio frequency signal indicative of the process condition is transmitted periodically when the process condition is within a programmed limit, but where the radio frequency signal is transmitted immediately upon detection of a condition outside the programmed limit.

12. The method of claim 11 in which the sensing of the process condition is sensing one of a temperature of the at least one steam trap and a presence of condensate within the at least one steam trap.

13. The method of claim 11 in which the sensing of the process condition involves sensing a pressure of a steam line feeding the at least one steam trap.

14. The method of claim 13 where the period between successive steps of sensing the process condition is within the range of from about 0.2 to about 5 seconds, and the period between successive steps of transmitting the radio frequency signal is within the range of from about 0.5 to about 300 seconds.

15. The method of claim 11 where the process condition is sensed more frequently than the transmission of the radio frequency signal from the at least one steam trap.

* * * * *